(12) United States Patent
Wagar et al.

(10) Patent No.: US 9,666,157 B2
(45) Date of Patent: May 30, 2017

(54) APPLICATION TO MEASURE DISPLAY SIZE

(75) Inventors: Jason W. Wagar, Leander, TX (US);
Barry S. Gilbert, Maplewood, MN (US); Donny Q. Chau, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 996 days.

(21) Appl. No.: 13/997,690

(22) PCT Filed: Dec. 27, 2011

(86) PCT No.: PCT/US2011/067331
§ 371 (c)(1),
(2), (4) Date: Jun. 25, 2013

(87) PCT Pub. No.: WO01/33988
PCT Pub. Date: May 17, 2001

(65) Prior Publication Data
US 2013/0286020 A1    Oct. 31, 2013

Related U.S. Application Data

(60) Provisional application No. 61/430,584, filed on Jan. 7, 2011.

(51) Int. Cl.
  *G01B 5/18* (2006.01)
  *G01B 7/26* (2006.01)
  (Continued)

(52) U.S. Cl.
  CPC ............ *G09G 5/003* (2013.01); *G01B 11/02* (2013.01); *G06F 3/0481* (2013.01); *G09G 2320/0693* (2013.01)

(58) Field of Classification Search
  CPC .... G06F 17/30312; G06F 17/50; G06F 19/12; G06F 19/3437; G06F 3/0481;
  (Continued)

(56) References Cited

U.S. PATENT DOCUMENTS 5,410,642 A * 4/1995 Hakamatsuka ....... G06F 17/243
                                                          358/1.14
6,326,979 B1   12/2001 Radeztsky
(Continued)

FOREIGN PATENT DOCUMENTS

EP    0932138    7/1999
EP    0932139    7/1999
(Continued)

OTHER PUBLICATIONS

International Application PCT/US2011/067331 Search Report dated Apr. 16, 2012.
(Continued)

*Primary Examiner* — Roy Y Yi
(74) *Attorney, Agent, or Firm* — Daniel J. Iden

(57) ABSTRACT

A method includes initializing a software program configured to determine a display height and a display width on a display, receiving input dimensions of a standard sized object into the software program, determining the display height and the display width based on the input dimensions of a standard sized object, and outputting the display height and the display width from the software program.

20 Claims, 3 Drawing Sheets

(51) Int. Cl.
  *G01B 11/22* (2006.01)
  *G01B 13/14* (2006.01)
  *G01B 21/18* (2006.01)
  *G09G 5/00* (2006.01)
  *G01B 11/02* (2006.01)
  *G06F 3/0481* (2013.01)

(58) Field of Classification Search
  CPC ............ G06F 3/0482; G06F 3/04842; G06F 17/30905; G06F 17/2247; G06F 3/04847; G06F 3/0484; G06F 3/0488; G06F 3/1446
  See application file for complete search history.

(56) References Cited

U.S. PATENT DOCUMENTS

| | | |
|---|---|---|
| 6,630,938 B1 | 10/2003 | Nanni |
| 6,708,059 B1 | 3/2004 | Radeztsky |
| 7,103,406 B2 | 9/2006 | Radeztsky |
| 7,125,381 B2 | 10/2006 | Radeztsky |
| 7,333,219 B2 | 2/2008 | Yu |
| 7,382,911 B1* | 6/2008 | Meier ................ G06K 7/10851 382/139 |
| 7,952,610 B2 | 5/2011 | Okumura |
| 2007/0090189 A1* | 4/2007 | Suwa ................. G01B 11/2522 235/454 |
| 2011/0061251 A1* | 3/2011 | Mahajan .................. G01C 3/04 33/278 |
| 2011/0227327 A1* | 9/2011 | Prichard ............. A45C 11/182 283/72 |

FOREIGN PATENT DOCUMENTS

| | | |
|---|---|---|
| JP | 2008-224484 | 9/2008 |
| JP | 2010-032330 | 2/2010 |
| JP | 2012-032341 | 2/2012 |
| WO | WO 01/33988 | 5/2001 |

OTHER PUBLICATIONS

International Application PCT/US2011/067331 Written Opinion dated Apr. 16, 2012.

\* cited by examiner

APPLICATION TO MEASURE DISPLAY SIZE

BACKGROUND

Light control films (LCFs), including privacy filters such as 3M's Advanced Light control films (ALCF), is an optical film that is configured to regulate the directionality of transmitted light. Various LCFs are known, and typically include a light transmissive film having a plurality of parallel louvers. Depending on the orientation of the louvers, the LCF may provide for maximum transmission at a predetermined angle of incidence with respect to the image plane and provide for image cut-off or black-out along a given polar coordinate (e.g., horizontally in the case of so-called privacy filters).

LCFs may be placed proximate a display surface. Typically, LCFs are designed such that at normal incidence, (i.e., 0 degree viewing angle, when a viewer is looking at an image through the LCF in a direction that is perpendicular to the film surface and image plane), the image is viewable. As the viewing angle increases, the amount of light transmitted through the LCF decreases until a viewing cutoff angle is reached where substantially all the light is blocked by the light-absorbing material and the image is no longer viewable. When used as a so-called privacy filter (for instance, for liquid crystal displays in computer monitors or laptop displays), this characteristic of LCFs can provide privacy to a viewer by blocking observation by others that are outside the view angle. 3M ALCF Privacy Filters are commercially available from 3M Company, St. Paul, Minn., under the trade designation "3M™ Filters for Notebook Computers and LCD Monitors."

Matching the size of a privacy filter, or any other display film, to the display size is not a trivial task. It is important that the privacy filter or display film fit the display size properly to maximize the optical properties. Simply measuring the display size with a physical ruler can be difficult. Matching the correct model privacy filter or display film can be confusing to the consumer also.

BRIEF SUMMARY

The present disclosure relates to an application that measures a display size. In particular, the present disclosure relates to an application that measures a display size and selects the proper display film to fit that display. Throughout the specification, the term display film may be used, or a particular type of display film may be identified (e.g., privacy filter, protection film, protection privacy filter, polarizer, anti-glare film, matte or glossy film, etc). Nonetheless, it should be understood that unless the context implies otherwise, when display films generally are referred to, or any particular type or types of display film is referred to, that the scope of the invention is not limited to a selection of any type of display film but rather encompasses display films generally. Further, it should be understood that filters and films, while occupying different meanings in the art, are interchangeable for the present description unless implied otherwise by the context.

In one illustrative embodiment, a method includes initializing a software program configured to determine a display height and a display width on a display, receiving input dimensions of a standard sized object into the software program, determining the display height and the display width based on the input dimensions of a standard sized object, and outputting the display height and the display width from the software program.

In another illustrative embodiment, a non-transitory computer readable medium is programmed with instructions to cause a computer to determine a height and width of a display by collecting a display resolution and receiving a pixel height and a pixel width of a standard sized object and then utilizing the display resolution and the pixel height and the pixel width of the standard sized object to determine the height and width of the display.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
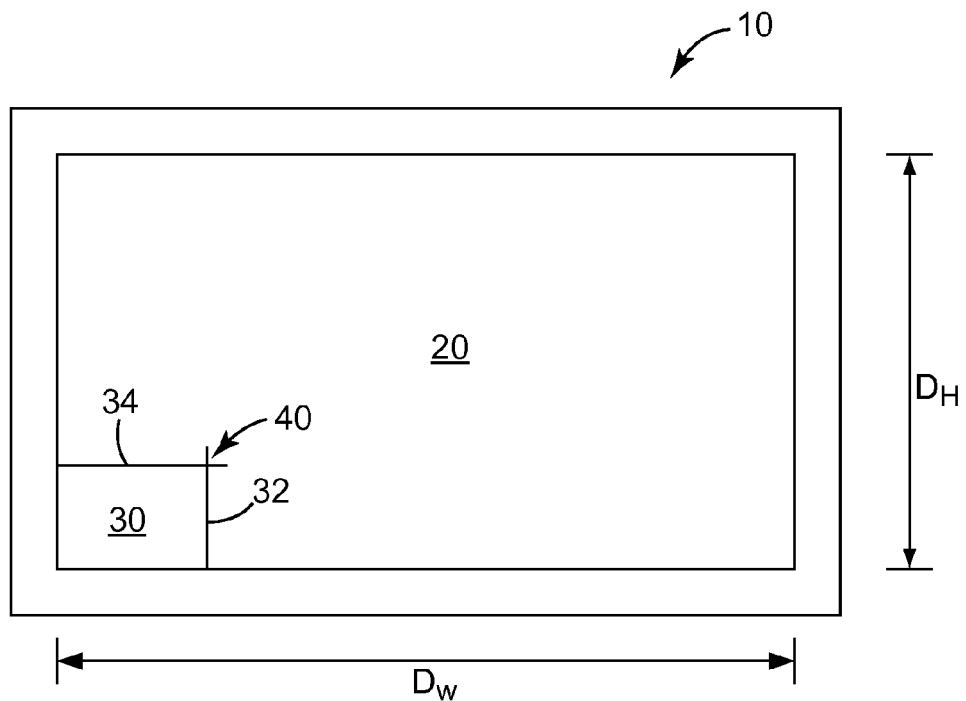
FIG. 1 is a schematic diagram of an illustrative display.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if a cell depicted in the figures is turned over or flipped over, portions previously described as below or beneath other elements would then be above those other elements.

The present disclosure relates to an application that measures a display size. In particular, the present disclosure relates to an application that determines a display size and outputs the proper privacy filter or display film size or model identification to fit or match the display and can optionally maximize the optical properties of the display. The concept of this disclosure is to use an object of known physical size to use as a reference to measure the size of a display via a software application running remotely or locally. The software application programmatically gathers the display resolution and then uses the physical object along with the user input of the size of the physical object to calculate the display physical dimensions (display height and display width). In particular, the application utilizes a standard size object that can be disposed on a portion of the display. The standard size object can be, for example, an object conforming to the ISO/IEC 7810 ID-1 standard. The ISO/IEC 7810 ID-1 standard is defined by the International Organization for Standardization (ISO) and the International Electrotechnical Commission (IEC) and is widely used for banking cards (credit cards, debit cards, ATM cards, etc.), driver's licenses and ID cards. The ISO/IEC 7810 ID-1 format specifies a size of 85.60 mm×53.98 mm. A user inputs the physical size of the standard size object by, for example, moving the curser to outline the dimensions (a pixel height and pixel width) of the standard size object. The application utilizes a ratio of the known resolution to the defined pixel size of the standard size object to determine the dimensions of the display. An appropriately sized privacy filter or display film can then be an output of the application. While the present disclosure is not so limited, an appreciation of various aspects of the disclosure will be gained through a discussion of the examples provided below.

FIG. 1 is a schematic diagram of an illustrative display 10. The display has a display surface 20 and a display height $D_H$ and a display width $D_W$. A computer program or software is configured to be displayed on the display 10 and determine the display height $D_H$ and the display width $D_W$ and in some embodiments output a privacy film or display film that will fit or match with the display 10.

The computer program or software is provided by a non-transitory computer readable medium that is stored locally on the computer in memory or provided over an internet connection. The non-transitory computer readable medium is programmed with instructions to cause a computer to determine a height $D_H$ and width $D_W$ of a display 10 by collecting a display resolution (by interrogating the computer or computer operating system, for example) and receiving a pixel height 32 and a pixel width 34 of a standard sized object 30 (as described below) and utilizing the display resolution and the pixel height and the pixel width of the standard sized object to determine the height $D_H$ and width $D_W$ of the display.

The standard sized object 30 can be any object having known dimensions. In many embodiments, the standard sized object 30 conforms to the ISO/IEC 7810 ID-1 standard. The ISO/IEC 7810 ID-1 standard is defined by the International Organization for Standardization (ISO) and the International Electrotechnical Commission (IEC) and is widely used for banking cards (credit cards, debit cards, ATM cards, etc.), driver's licenses and ID cards. The ISO/IEC 7810 ID-1 format specifies a size of 85.60 mm×53.98 mm.

The standard sized object 30 can be disposed over a specified portion of the display surface 20. An input device such as a curser 40 input, for example, can define the standard sized object 30 pixel height 32 and the standard sized object pixel width 34 while the standard sized object 30 is disposed over the specified portion of the display surface 20. The computer program or software receives the dimensions (e.g., pixel height 32 and pixel width 34) of the standard sized object 30 and utilizes theses dimensions to determine the display height $D_H$ and the display width $D_W$.

Software for implementing the methods described herein can be written in JavaScript using the jQuery Framework (jQuery is a JavaScript library developed by the jQuery Project which is part of the Software Freedom Conservancy, Inc. (Brooklyn, N.Y.) and is available from jquery.com). Using standard HTML code fixed alignment lines can be drawn near the lower left hand corner of the display screen with known pixel positions. The user would be instructed to place a standard size object (e.g., credit card) in the lower left hand corner, for example, aligned with the fixed alignment lines. The user would then be instructed to position the cursor at the upper right hand corner of the standard size object and to click the mouse to set the cursor location. Using standard HTML programming, lines can optionally be drawn on the display screen from the left hand border to the mouse position and from the bottom border to the mouse position in order aid the user in positioning the cursor. The location of the cursor when the mouse click occurred can be determined using the JavaScript methods event.pageX and event.pageY. The number of pixels in the area covered by the standard size object can then be calculated from the position of the cursor when the mouse click occurred and the known position of the fixed alignment lines. The dimensions of the display or monitor in pixels can be determined using the JavaScript screen methods of screen.height( ) and screen.width( ). Display height can be calculated from the total number of pixels in the vertical direction divided by number of pixels in the vertical direction covered by the standard size object times the height of the standard size object. Similarly, display width can be calculated from the total number of pixels in the horizontal direction divided by the number of pixels in the horizontal direction covered by the standard size object times the width of the standard size object. The screen diagonal can then be computed using the Pythagorean Theorem. Alternatively, the display size can be calculated in terms of number of standard size objects and then converted to numerical dimensions using the know size of the standard size object.

Figure 2:
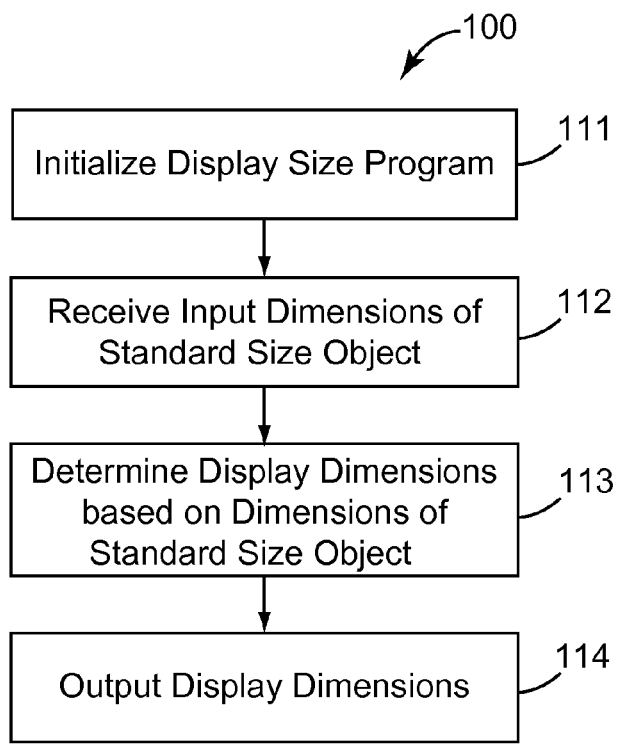
FIG. 2 is a flow diagram of an illustrative method.

FIG. 2 is a flow diagram of an illustrative method 100. The method 100 includes initializing a software program configured to determine a display height and a display width on a display (111), receiving input dimensions of a standard sized object into the software program (112), determining the display height and the display width based on the input dimensions of a standard sized object (113), and outputting the display height and the display width from the software program.

The standard sized object has a standard size height and a standard size width and the input dimensions are a standard sized object pixel height and a standard sized object pixel width. The standard size object is described above and can be received by the software program by any useful means or method. In some embodiments, the software program receives a cursor location that defines a standard sized object pixel height and a standard sized object pixel width with an input device. For example, a user can overlay a standard size object on the display surface at a specification location of the display surface and position a curser with a mouse or pointing device at a corner of the standard size object, to define a perimeter of the standard size object.

The software program can receive or obtain a display resolution of the display. The software program can utilize the display resolution of the display to calculate or determine the display height and the display width based on the input dimensions of a standard sized object and the display resolution of the display, as described herein. In many embodiments, the outputting step includes outputting a privacy film or display film size or model identification.

Figure 3:
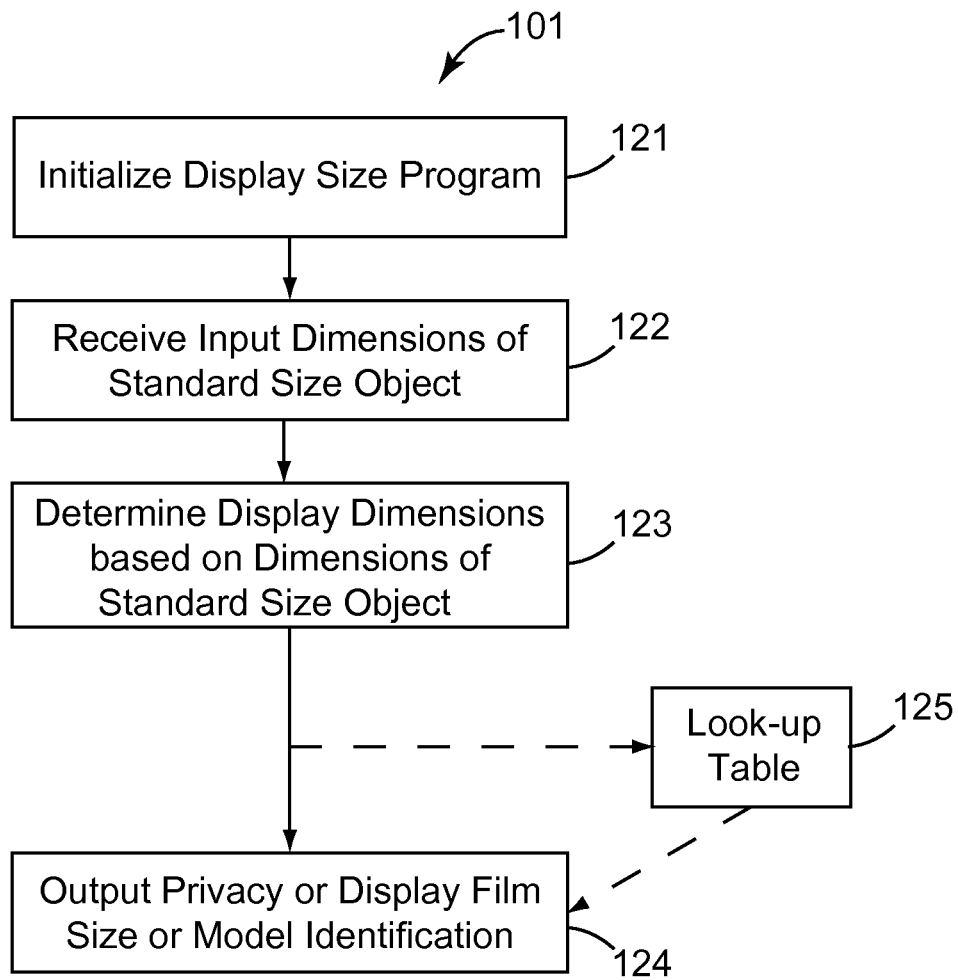
FIG. 3 is a flow diagram of another illustrative method.

FIG. 3 is a flow diagram of another illustrative method. 101 The method 101 includes initializing a software program configured to determine a display height and a display width on a display (121), receiving input dimensions of a standard sized object into the software program (122), determining the display height and the display width based on the input dimensions of a standard sized object (123), and outputting the a privacy film or display film size or model identification from the software program. The software program can optionally utilize a look-up table (125) to determine the privacy film or display film size or model identification.

The standard sized object has a standard size height and a standard size width and the input dimensions are a standard sized object pixel height and a standard sized object pixel width. The standard size object is described above and can be received by the software program by any useful means or method. In some embodiments, the software program receives a cursor location that defines a standard sized object pixel height and a standard sized object pixel width with an input device. For example, a user can overlay a standard size object on the display surface at a specification location of the display surface and position a curser with a mouse or pointing device at a corner of the standard size object, to define a perimeter of the standard size object.

The software program can receive or obtain a display resolution of the display. The software program can utilize the display resolution of the display to calculate or determine the display height and the display width based on the input dimensions of a standard sized object and the display resolution of the display, as described herein.

Figure 4:
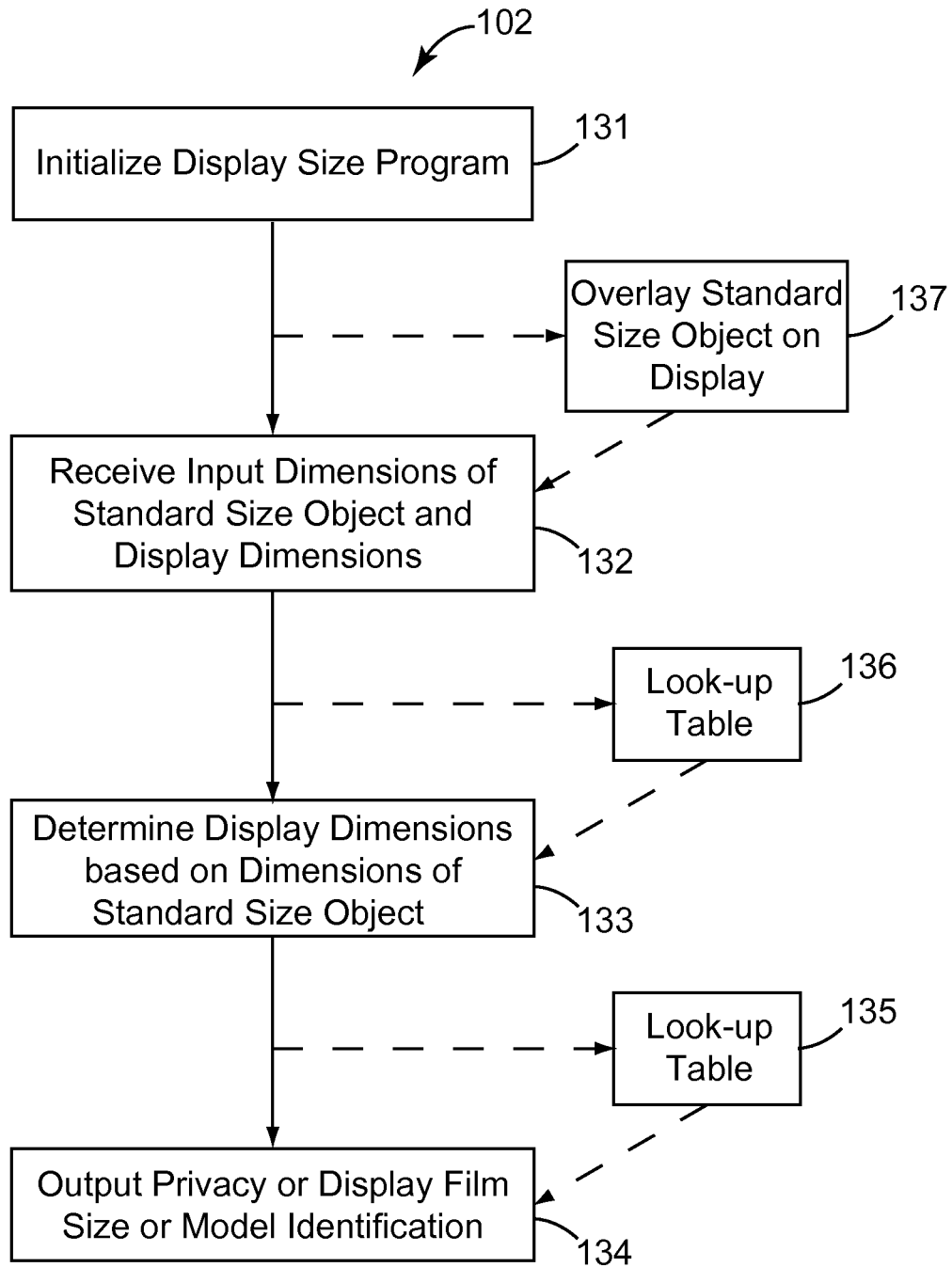
FIG. 4 is a flow diagram of another illustrative method.

FIG. 4 is a flow diagram of another illustrative method 102. The method 102 includes initializing a software program configured to determine a display height and a display width on a display (131) and receiving input dimensions of a standard sized object and display resolution into the software program (132). The standard sized object can optionally be disposed over a portion of the display surface by a user.

The standard sized object has a standard size height and a standard size width and the input dimensions are a standard sized object pixel height and a standard sized object pixel width. The standard size object is described above and can be received by the software program by any useful means or method. In some embodiments, the software program receives a cursor location that defines a standard sized object pixel height and a standard sized object pixel width with an input device. For example, a user can overlay a standard size object on the display surface at a specification location of the display surface and position a curser with a mouse or pointing device at a corner of the standard size object, to define a perimeter of the standard size object. The software program can receive or obtain a display resolution of the display.

The software program can then utilize the display resolution of the display to calculate or determine the display height and the display width based on the input dimensions of a standard sized object and the display resolution of the display (133), as described herein. The software program can optionally utilize a look-up table (136) to determine the display height and the display width.

The software program can then output the privacy film or display film size or model identification from the software program (134). The software program can optionally utilize a look-up table (125) to determine the privacy film or display film size or model identification.

Thus, embodiments of the APPLICATION TO MEASURE DISPLAY SIZE are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present disclosure is limited only by the claims that follow.

What is claimed is:

1. A method comprising:
    initializing a software program configured to determine a display height and a display width of a display;
    overlaying a standard sized object on a portion of the display;
    receiving input dimensions of the standard sized object into the software program by determining a cursor location on the display;
    determining the display height and the display width of the display based on the input dimensions of the standard sized object; and
    outputting the display height and the display width from the software program.

2. The method of claim 1, wherein the standard sized object has a standard size height and a standard size width and the input dimensions comprise a standard sized object pixel height and a standard sized object pixel width.

3. The method of claim 1, wherein the receiving step comprises receiving the cursor location with an input device, wherein the cursor location defines a standard sized object pixel height and a standard sized object pixel width.

4. The method of claim 1, further comprising obtaining a display resolution into the software program.

5. The method of claim 1, wherein the standard sized object has dimensions specified by the ISO/IEC 7810 ID-1 format.

6. The method of claim 1, wherein the outputting step comprises outputting a privacy film or display film size or model identification.

7. The method of claim 1, wherein the determining step utilizes a look-up table.

8. The method of claim 6, wherein the determining step utilizes a look-up table to determine the privacy film or display film size.

9. The method of claim 8, wherein the determining step utilizes a look-up table to determine a privacy film or display film model identification as an output.

10. The method of claim 1, wherein the determining step utilizes a look-up table to determine a privacy film or display film size and outputs a privacy film or display film model identification.

11. A method comprising:
    initializing a software program configured to determine a display height and a display width of a display;
    overlaying a standard sized object on a portion of the display;
    receiving a cursor location indicative of a pixel height and a pixel width of the standard sized object into the software program from an input device;

determining the display height and the display width of the display based on the pixel height and the pixel width of the standard sized object; and determining a privacy film or display film size or model identification to fit the display height and the display width.

12. The method of claim 11, wherein receiving the cursor location comprises receiving a cursor input.

13. The method of claim 11, wherein the software program is configured to obtain a display resolution into the software program.

14. The method of claim 11, wherein the standard sized object has dimensions specified by the ISO/IEC 7810 ID-1 format.

15. The method of claim 11, wherein the software program utilizes a look-up table to determine the display height and the display width.

16. The method of claim 11, wherein the software program utilizes a look-up table to determine the privacy film or display film size.

17. The method of claim 16, wherein the software program utilizes a look-up table to determine a privacy film or display film model identification as an output.

18. The method of claim 11, wherein the software program utilizes a look-up table to determine a privacy film or display film size and provides a privacy film or display film model identification as an output.

19. A non-transitory computer readable medium programmed with instructions to cause a computer to determine a height and width of a display by collecting a display resolution and receiving a pixel height and a pixel width of a standard sized object overlaid on a portion of the display by determining a cursor location on the display, and then utilizing the display resolution and the pixel height and the pixel width of the standard sized object to determine the height and width of the display.

20. The non-transitory computer readable medium of claim 19, wherein the instructions to cause a computer to determine a privacy film or display film size or model identification as an output.

\* \* \* \* \*

UNITED STATES PATENT AND TRADEMARK OFFICE
CERTIFICATE OF CORRECTION

PATENT NO. : 9,666,157 B2
APPLICATION NO. : 13/997690
DATED : May 30, 2017
INVENTOR(S) : Jason Wagar It is certified that error appears in the above-identified patent and that said Letters Patent is hereby corrected as shown below:

On the Title Page

Item [87], Column 1 (PCT Pub. No.), Line 1:
Delete "WO01/33988" and insert -- WO2012/094190 --, therefor.
Column 1 (PCT Pub. Date), Line 1:
Delete "May 17, 2001" and insert -- July 12, 2012 --, therefor.

Signed and Sealed this
Fifth Day of December, 2017

Joseph Matal
*Performing the Functions and Duties of the*
*Under Secretary of Commerce for Intellectual Property and*
*Director of the United States Patent and Trademark Office*